W. G. BETZ.
PNEUMATIC PIANO.
APPLICATION FILED FEB. 2, 1911.
1,012,317.
Patented Dec. 19, 1911.
Fig-1-
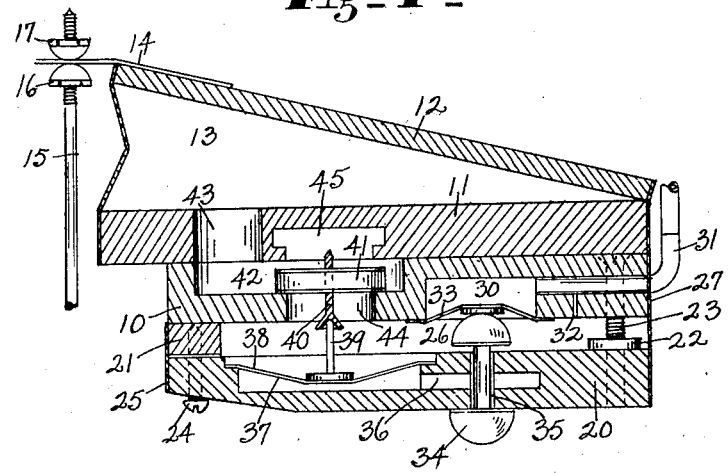
Fig-2-
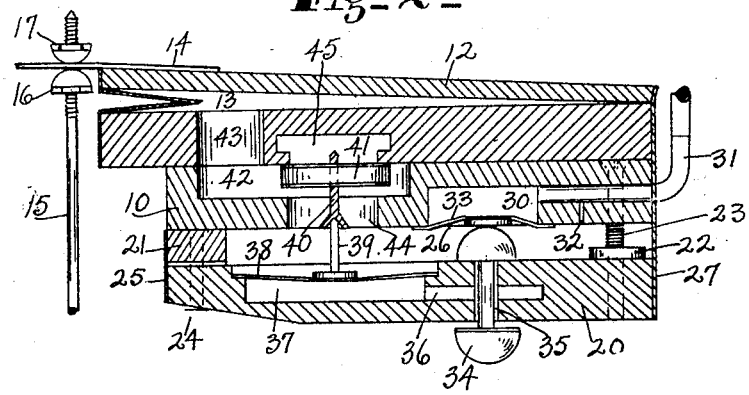
WITNESSES:
O. M. McLaughlin
W. M. Gentle
INVENTOR,
William G. Betz.
BY
V H Lockwood
ATTORNEY

UNITED STATES PATENT OFFICE.

WILLIAM G. BETZ, OF CHICAGO HEIGHTS, ILLINOIS, ASSIGNOR TO STEGER & SONS PIANO MANUFACTURING COMPANY, OF CHICAGO, ILLINOIS, A CORPORATION.

PNEUMATIC PIANO.

1,012,317.  Specification of Letters Patent.  Patented Dec. 19, 1911.

Application filed February 2, 1911. Serial No. 606,221.

*To all whom it may concern:*

Be it known that I, WILLIAM G. BETZ, a citizen of the United States, and a resident of Chicago Heights, county of Cook, and State of Illinois, have invented a certain useful Pneumatic Piano; and I do hereby declare that the following is a full, clear, and exact description thereof, reference being had to the accompanying drawings.
The object of this invention is to improve the construction of power pneumatics for pneumatic pianos, with particular reference to the location of the primary valve and pouch in relation to the remaining parts of the power pneumatic and also other features which will be understood from the accompanying drawings and the following description and claims:

In the drawings Figure 1 is a central vertical section longitudinally through the power pneumatic in normal position, parts being broken away. Fig. 2 is a similar view showing the positions of parts when in operation.

A stationary plate 10 extends transversely across the piano. Upon it a bottom plate 11 of the bellows 12 is secured, the remaining portion of the bellows consisting of the top hinged plate 12 and the flexible intermediate casing 13. An arm 14 projects from the upper forward portion of the plate 12 and is engaged by a rod 15 which extends through a hole in the arm 14 with adjusting nuts 16 and 17 on said rod 15. The rod 16 extends down to a lever or other means for operating the piano action, which, however, is not here shown.

Below the fixed plate 10 there is an adjustable plate 20 extending across the piano parallel substantially with the plate 10 and spaced therefrom by a bar 21 at the front and nuts 22 on screws 23 near the rear and at the ends of the plates 10 and 20. The bar 21 is secured to the plate 10 and screws 24 extend through the plate 20 into the bar 21 and an impervious cloth strip 25 covers said parts along the front to render the same air tight for the suction chamber 26 is located between the plates 10 and 20. The rear wall of said chamber 26 is formed by an impervious, adhesive strip 27 which is secured to the rear surfaces of the parts 20, 10, 11 and 12. The screws 23 are stationary in the plate 10 and project into holes in the plate 20 and the nuts 22 screw on the screws 23 and bear against the plate 20 to space it away from the plate 10 in order to give the suction chamber 26 the desired depth for the purpose hereinafter explained.

The suction chamber 26 is in communication with an exhausting means, not shown, but which is familiar to all acquainted with this art. In the underside of the plate 10 there is a pouch chamber 30 in communication with the tracker board of the piano, not shown, through a tube 31. A bleed hole 32 extends from the horizontal portion of the tube 31 down to the suction chamber 26. The open, lower side of the chamber 30 is closed by a primary pouch 33. A primary valve 34 is located below said pouch and is a double valve, consisting of a stem with valve heads on the upper and lower ends. The length of this stem slightly exceeds the thickness of the plate 20 and fits in a hole or air passageway 35 through the plate 20 which is of larger diameter than the stem of the valve. A horizontal air chamber 36 is located in the plate 20 in communication with the air passageway 35 and the chamber 36 is in communication with that portion of the secondary pouch chamber 37 in the upper surface of the plate 20 which lies below the secondary pouch 38. A stem 39 extends upwardly from the secondary pouch through the chamber 26 and into engagement with the cup-shaped lower end of a stem 40 of a valve 41 which lies in a chamber 42 in the upper surface of the plate 10 and adjacent the plate 11 of the bellows and in communication with the bellows chamber through a passageway 43 which extends through the plate 11. A passageway 44 extends through the portion of the plate 10 which lies between the chambers 26 and 42. An air port 45 is formed in the lower surface of the plate 11 of the bellows in position to be closed by the secondary valve 41 when it is up.

In operation the parts normally are in the position shown in Fig. 1. When a tube 31 registers with an opening in the tracker board, and outside air enters through the tube 31, it actuates the primary pouch 30 which pushes the primary valve down in the position shown in Fig. 2, and the passageway 35 is open and it is in communication with the pouch chamber 37 directly through the chamber 36 so that said secondary pouch is actuated by the external air pressure and the secondary valve 41 lifted so as to close the air port 45 and open the passageway 44, whereby the air is exhausted from the bellows through the passageways 43, 42 and 44 and the chamber 26, and, thereby the bellows is actuated by the external air pressure.

When the tube 31 ceases to register with the opening in the tracker board, and the air is drawn slightly from the primary pouch chamber 30 through the bleed hole 32 so that said pouch returns to its upper position and the air on 34 as against suction in 30 and 26 lifts the primary valve and closes the passageway 35, chamber 36 and chamber 37, it will return the secondary pouch, whereby the secondary valve descends and opens the air port 45 which permits the bellows to return to its normal position. It is thus seen that the primary valve is located in a vertical position and that the primary pouch is over the valve so that no dust can enter the suction chamber and power pneumatic, for while the device is idle, gravity will hold the primary valve down, closing the passageway 35 and when it is in use and the primary valve is up, the passageway 35 is also closed. Furthermore, there is direct communication between the primary valve controlled passageway and the secondary pouch chamber which greatly simplifies the apparatus and renders it extremely quick and sensitive in action and makes the device also compact. Furthermore, this construction enables the bleed hole to be in the wall above the suction chamber 26 so that the bleed hole will not become filled with dust by reason of any dust which enters said chamber and when any air passes through the bleed hole to said chamber 26, it tends to clear the bleed hole rather than fill it with dust. Also the bellows forms the top of the air chamber for the secondary valve which renders the construction very simple and compact and quick and direct in action. This is promoted by the air outlet port from the bellows being also above the secondary valve so that said valve accomplishes the double function of opening and closing it. Both the primary and secondary valves and pouches are located beneath the bellows which renders the construction compact and direct and quick in action.

By reason of the adjustability of the plate 20 all of the primary valves can be simultaneously adjusted in their relation to the primary pouches or, in other words, the suction chamber 26 can be adjusted throughout its entire length by one adjustment. This is accomplished by removing the lower part of the cloth strip 27 from the rear surface of the plate 20, turning the nuts 22 to accomplish the desired adjustment, and then replacing the strip 27. Heretofore, so far as I am aware, it has been necessary to separately adjust each of the primary valves and since their number is very great, it has been a source of considerable trouble and labor.

I claim as my invention:

1. In a pneumatic piano, two parallel plates extending transversely of the piano, a primary valve in the lower plate, a secondary valve in the upper plate, a pouch for each valve located in the plate opposite the plate in which the valves are located, and means for adjusting the space between said plates.

2. In a pneumatic piano, two parallel plates extending transversely of the piano, a primary valve in the lower plate, a secondary valve in the upper plate, a pouch for each valve located in the plate opposite the plate in which the valves are located, a flexible wall connecting said plates, and means for adjusting them with reference to each other.

3. In a pneumatic piano a bellows with an air passageway through the lower wall thereof and another air passageway in the lower wall of the bellows leading to the outer air, a pair of plates below said bellows and spaced apart to form a suction chamber between them, an air chamber in the upper surface of the upper one of said plates which is in communication with the air passageway in the bellows and said passageway to the outer air, a reduced passageway between said chamber and the suction chamber which is below the passage to said outer air, and a secondary valve controlling a port leading into said air chamber and between the air passageway thereto from the suction chamber and the passage to the outer air, whereby the former will be closed by the secondary valve when it is down and the latter passage closed thereby when it is open.

4. In a pneumatic piano a pair of plates extending transversely thereof which are spaced apart to form a suction chamber, one of said plates being fixed and the other adjustable with relation to said fixed plate, and primary valves mounted in the adjustable plate, whereby all of the primary valves may be simultaneously adjusted.

5. In a pneumatic piano a pair of plates extending transversely of the piano and spaced apart to form a suction chamber, primary valves mounted in the lower one of said plates, and means for adjusting said lower plate with relation to the upper plate in order to simultaneously adjust the position of said valves.

In witness whereof, I have hereunto affixed my signature in the presence of the witnesses herein named.

WILLIAM G. BETZ.

Witnesses:
H. C. WEHLAN,
OLGA PETERSON.